(12) United States Patent
Wilkendorf

(10) Patent No.: US 7,232,518 B2
(45) Date of Patent: Jun. 19, 2007

(54) FILTER DEVICE

(75) Inventor: Werner Wilkendorf, Ottweiler (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 259 days.

(21) Appl. No.: 10/398,772

(22) PCT Filed: Oct. 6, 2001

(86) PCT No.: PCT/EP01/11551

§ 371 (c)(1),
(2), (4) Date: Apr. 10, 2003

(87) PCT Pub. No.: WO02/31365

PCT Pub. Date: Apr. 18, 2002

(65) Prior Publication Data

US 2004/0011714 A1    Jan. 22, 2004

(30) Foreign Application Priority Data

Oct. 11, 2000  (DE) .............................. 100 50 128

(51) Int. Cl.
*B01D 35/00* (2006.01)
*B01D 35/147* (2006.01)
*F01M 5/00* (2006.01)

(52) U.S. Cl. ................. 210/167.08; 210/117; 210/120; 210/136; 210/167.02; 210/181; 210/416.5; 210/420; 184/6.21; 184/6.22; 60/453; 60/454; 60/456

(58) Field of Classification Search ................ 210/295, 210/302, 117, 136, 120, 420, 424, 149, 171, 210/180, 181, 167.02, 167.06, 167.08, 184, 210/186, 416.5; 184/6.21, 6.22; 123/196 A, 123/196 AB, 41.33; 60/453, 454, 456
See application file for complete search history.

(56) References Cited

U.S. PATENT DOCUMENTS 3,990,424 A    11/1976   Miersch et al.

(Continued)

FOREIGN PATENT DOCUMENTS

| CH | 411503   | 4/1966 |
|----|----------|--------|
| DE | 1932908  | 3/1970 |
| DE | 2943526  | 5/1981 |
| DE | 3402884  | 8/1984 |
| DE | 19950052 | 5/2001 |
| EP | 0691234  | 1/1996 |
| FR | 944219   | 3/1949 |
| GB | 2164395  | 3/1986 |
| JP | 09066749 | 3/1997 |

*Primary Examiner*—John Kim
(74) *Attorney, Agent, or Firm*—Roylance, Abrams, Berdo & Goodman, L.L.P.

(57) ABSTRACT

A filter device includes at least one filter unit (10), connectable to a hydraulic circuit (14), with at least one supply line (16), one discharge line (18), and at least one cooling unit (22). The cooling unit is connected to a secondary branch line (20), is connected to the hydraulic unit (14) parallel to the supply line (16), and is supplied with a hydraulic medium by a switching device (24) once a predetermined temperature threshold value of the hydraulic medium to be cooled is attained. A permanent supply (36) for the cooling unit (22) is provided in the direction of flow of the hydraulic medium in the supply line (18) before the switching device (24). This permanent supply (36), connected in parallel to the switching device (24), flows into the secondary branch line (20) to control the volume flow in reverse flow according to the fluid temperature. A partial flow of the hydraulic medium in the supply line directly reaches the cooling unit at low or reduced temperatures, at which the switching device has not yet been actuated to ensure that the cooling unit is permanently supplied with the hydraulic medium.

12 Claims, 3 Drawing Sheets

U.S. PATENT DOCUMENTS

| | | |
|---|---|---|
| 4,027,643 A | 6/1977 | Feenan et al. |
| 4,174,699 A | 11/1979 | Gill |
| 4,181,611 A * | 1/1980 | Rubenstein et al. ........ 210/149 |
| 4,406,787 A * | 9/1983 | Suto et al. ................. 210/315 |
| 4,512,300 A | 4/1985 | DeVore et al. |
| 4,780,061 A * | 10/1988 | Butterworth ................ 417/371 |
| 5,217,085 A * | 6/1993 | Barrie et al. ............. 184/104.1 |
| 6,527,947 B1 * | 3/2003 | Channing et al. ........... 210/136 |

* cited by examiner

FILTER DEVICE

FIELD OF THE INVENTION

The present invention relates to a filter device with at least one filter unit which can be connected to a hydraulic circuit, with at least one supply line and one drain line. At least one cooling unit is connected in a secondary branch line and is connected parallel to the supply line into the hydraulic circuit. At a definable temperature threshold of the hydraulic medium to be cooled is supplied to the cooling unit by a changeover means.

BACKGROUND OF THE INVENTION

In known approaches, as are freely available on the market, filter devices are used in all types of hydraulic systems, especially in construction machines. Filter units, called return line intake filters, are in the return lines of the respective hydraulic system discharge. The return lines are combined into collectors which ensure central inflow of the fouled fluid or hydraulic medium to the respective return line intake filter unit. After filtration, the cleaned fluid is relayed to an intake connection to supply the hydraulic system with the cleaned hydraulic medium.

To prevent overheating of the hydraulic system, a cooling unit can be connected upstream to the supply line into which the return lines discharge before admission into the actual filter circuit in the secondary branch line. A conventional thermostat controller can turn on or off the cooling unit depending on the operating temperature of the hydraulic medium. Especially at low temperatures of the hydraulic medium, the changeover means, with the thermostat controller and/or the components of the cooling circuit itself can produce a banking-up pressure which leads to pressure peaks in the upstream units. For example, in a hydraulic motor and a hydraulic pump pressure peaks can damage the sealing elements. Furthermore, the fluid-carrying components in the known approach are connected to one another by the indicated collectors. Lines producing the pertinent fluid-carrying connections, can take place by conventional tubing technology using weld connections. Therefore, the known filter devices are structurally large and expensive to produce.

DE-A-34 02 884 A1 discloses a filter device with a thermostat installed in the system for regulating the temperature of the working liquid and opening or closing automatically the branch to the cooler depending on the temperature of the reversible working liquid in the system. The heated reversible working liquid flows directly out of the thermostat upstream of the filter into the intake branch of the filling liquid pump, i.e., bypassing the cooler and the tank. The thermostat closes the throughflow of working liquid into the part of the circuit which contains the cooler and tank when the temperature of the working liquid is low. When the temperature of the working liquid reaches the value at which the thermostat opens, part of the working liquid flows through the connecting branch into the cooler and on into the tank. The thermostat opens entirely when the temperature of the working liquid in the tank reaches the optimum value. All the working liquid which returns from the closed hydraulic circuit continues to flow only by way of the cooler into the tank. In this known approach, the thermostat can produce a banking-up pressure which leads to damaging pressure peaks in the upstream units especially at low temperatures of the hydraulic medium within the hydraulic circuit.

U.S. Pat. No. 3,990,424 discloses a generic filter device with at least one filter unit connected to a hydraulic circuit with at least one supply and drain line. At least one cooling unit is connected in a secondary branch line and is connected parallel to the supply line into the hydraulic circuit. By a changeover means, at a definable temperature threshold value of the hydraulic medium to be cooled, the medium is supplied to the circuit. In the flow direction of the hydraulic medium in the supply line upstream of the changeover means, a permanent supply for the cooling unit is provided. This permanent supply is connected parallel to the changeover means discharging into the secondary supply line. In this known filter device used especially in jet-propelled racing boats, the permanent supply is induced by the valve chamber to which the cooling unit is permanently connected to carry fluid. Depending on the respective temperature threshold value and therefore depending on the position of the changeover means, at low temperatures of the hydraulic medium, the medium is supplied directly to the filter unit. At high temperatures of the hydraulic medium, a detour takes place by the cooling unit before the medium which has then been cooled is supplied to the filter unit. As a result of the direct connection of the cooling unit to the valve chamber in the system, a damaging banking-up pressure can build up which leads to pressure peaks in the upstream units and in the cooling unit itself. In addition, the cooling unit can be exactly matched as a function block to the intended valve chamber using connection technology This arrangement causes production of the known design to become expensive.

SUMMARY OF THE INVENTION

Objects of the present invention are provided to improve filter devices such that the damaging banking-up pressure in the system is avoided while reliable operation is achieved. In addition, objects of the present invention are to provide a filter device having a small structure and being economical both in production and in operation.

The pertinent objects are basically achieved by a filter device which controls the volumetric flow in the return line depending on the fluid temperature such that even at low temperatures at which the changeover device has not yet been actuated, a partial flow of the hydraulic medium in the supply line travels directly to the cooling unit. The cooling unit is then permanently supplied with the hydraulic medium. Due a bypass circuit, the banking-up pressure is on the cooling unit independently of the actuation situation of the changeover device, by which the cooling unit can be vented at any time if necessary.

The permanent supply can be easily combined structurally with the changeover means, especially in one component so that little construction space is required. The filter device according to the present invention can be produced and operated easily and economically.

In one preferred embodiment of the filter device of the present invention, the changeover device has an oil temperature controller. The oil temperature controller has an operating characteristic such that, at low temperatures of the hydraulic medium, it clears a path for it to the filter unit. When the temperature threshold is reached, the oil temperature controller supplies the heated hydraulic medium to the cooling unit, which relays the cooled fluid to the filter unit by the secondary branch line. In this way the cooling unit can be triggered with a high degree of precision for a cooling process which operates in a defined manner by means of the oil temperature controller. The oil temperature controller can be a commercial component, known for example from the cooling circuit of internal combustion engines.

By way of a choke, venting of the downstream cooling unit is possible in any operating situation of the filter device. In the known filter devices, the venting is often only possible in the "high temperature" operating position or in an emergency operating position which, however, is to some extent only optionally available in the known devices.

In another preferred embodiment of the filter device of the present invention, viewed in the flow direction of the hydraulic medium, upstream of the changeover device, the return lines of a hydraulic motor and a hydraulic pump, particularly are combined into a hydrostatic transmission, discharge into the supply line. In the flow direction of the hydraulic medium downstream of the changeover device, the return line of the working hydraulics likewise discharges into the supply line. In this way, a compact structure for the filter device can be achieved. Also, the conventional connecting lines and collector means which are to be welded together can be omitted. Therefore, all connection possibilities for all existing modules are present combined into one unit. This combination leads to a filter device with a small structure. Preferably, at least the changeover device and the permanent supply are a component of a filter head being connectable to a housing part which holds the filter unit. In this way, the filter device can be included in the common filter housing of the filter unit and trigger unit.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
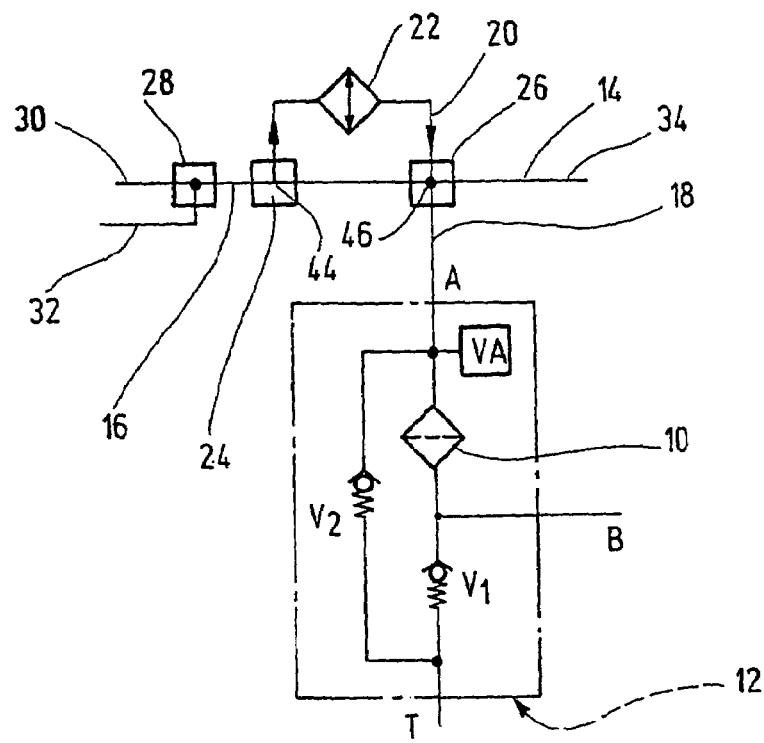
FIG. 1 is a schematic circuit diagram for a known filter device, as is freely available on the market.

The known or conventional filter device shown in FIG. 1 has a filter unit 10 of conventional design. The filter unit 10 is a component of a return line intake filter 12; its important components being encircled in FIG. 1 with a broken-line frame. The return line intake filter 12 is provided with a fouling display VA which delivers an optical or other signal indication with respect to the state of fouling of the actual filter unit 10. A spring-loaded check valve V2, in the manner of a bypass valve, is connected to the bypass line of the filter unit 10. If the filter unit 10 is clogged by fouling, the pretensioned bypass valve V2 opens to the tank T. In this way, dangerous pressure peaks cannot build up in the system. In the flow direction downstream of the filter unit 10, the intake connection B is provided which, in conjunction with the spring-loaded check valve V1, produces a pretensioning pressure which ensures that the oil column in the hydraulic circuit 14 cannot separate. The possible closing pressure of the bypass valve V2 is chosen to be greater than that of the check valve V1 to prevent the fluid, which is be filtered and which is supplied by way of the connection A, from being drained unintentionally in the direction of the tank unfiltered into the latter with bypassing of the filter unit 10.

The hydraulic circuit 14 has a supply line 16 and a drain line 18, with the drain line being connected to the connection A of the return line intake filter 12. The cooling unit 22 is connected in the secondary branch line 20 connected parallel to the supply line 16 in the hydraulic circuit 14. Viewed in the direction of FIG. 1, the secondary branch line 20 has one free end discharging into the changeover means 24 and has its other free end discharging into a collector 26 into which the supply line 16 and the drain line 18 discharge. At a definable temperature threshold value of the hydraulic medium to be cooled, the changeover means 24 is actuated and supplies the hydraulic medium which is to be cooled to the cooling unit 22. The cooled hydraulic medium is then relayed by the secondary branch line 20 to the collector 26 and from there conveyed by the drain line 18 into the return line intake filter 12.

After cleaning the fouled medium by the filter unit 10, the cleaned fluid or hydraulic medium is returned by the intake connection B to the hydraulic circuit 14 in which, for example, a hydraulic pump of a machine or machine tool is connected. Next to the collector 26, there is another or second collector 28 into which the return line 30 of the hydraulic motor (not shown) and the return line 32 of a hydraulic pump (not shown) discharge. The hydraulic motor and the hydraulic pump are components of a hydrostatic transmission for which the illustrated filter device is used. Since the arrangements in this regard, especially the hydrostatic transmission, are conventional or prior art, they are not described in detailed. Moreover the return line 34 of the actual working hydraulics (not shown), which has for example a conventional working cylinder for an excavator or the like, discharges into the collector 26.

Especially at low temperatures for the hydraulic medium, which arise for example when the hydraulic system is started up after having been idle for a long time, the components, especially return line intake filter 12, in the supply line 16 produce a resistance in the form of an increased banking-up pressure. In upstream units in the form of a hydraulic motor and hydraulic pump, this banking-up pressure can lead to damage of their sealing elements, causing failure of the entire hydraulic system. To prevent this failure, in the illustrated embodiment of the filter device of the present invention shown in FIG. 2, in the flow direction of the hydraulic medium in the supply line 16 upstream of the changeover means 24 and independently of its position, a permanent supply 36 is provided for the cooling unit 22. This permanent supply 36 is connected in parallel to the changeover means 24 discharging into the secondary branch line 20 with the cooling unit 22. The permanent supply 36 is made essentially in the manner of another inflow line or inflow channel.

Figure 2:
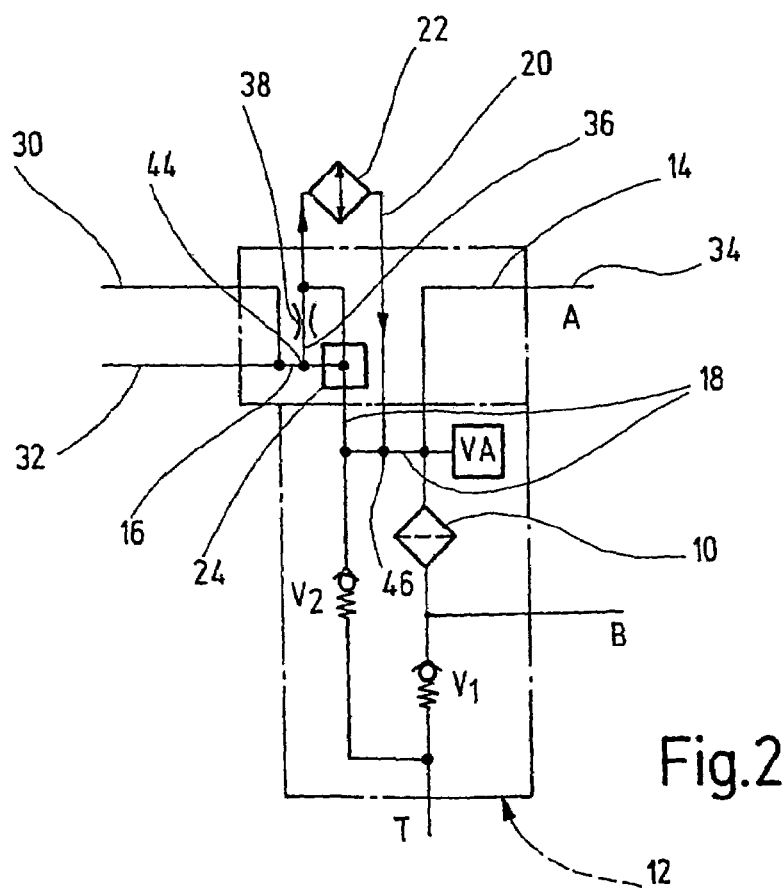
FIG. 2 is a schematic circuit diagram of the filter device according to an embodiment of the present invention, with its essential components.

The components according to the filter device as of the present invention shown in FIG. 2 are, to the extent they correspond to the known filter device shown in FIG. 1, labelled with the same reference numbers. The statements above in this regard also apply to the present invention shown in FIG. 2. Another difference is that the known collectors 26 and 28 in the embodiment of the present invention are completely omitted. Rather a direct connection technique of the components among one another with their supply lines is achieved, as detailed below.

The present invention also uses for the changeover means 24 a conventional oil temperature controller as is known for example in heating engineering. Its operating characteristic, at low temperatures of the hydraulic medium, clears the path for the medium to the filter unit 10 of the return line intake filter 12. When the temperature threshold is reached, it supplies the heated hydraulic medium to the cooling unit 22 which relays the cooled fluid to the filter unit 10 by the secondary branch line 20. The permanent supply 36, in the form of a corresponding connecting line or a connecting channel, is provided with a choke or a diaphragm 38 such that, especially in the operating "low temperature" situation for the hydraulic medium, a damaging banking-up pressure in the supply line 16 is avoided. Independently of the choke 38, in any case the line cross sections for the permanent supply 36 and the secondary branch line 20 are increased to avoid resistances in the hydraulic circuit 14, with the banking-up pressure in the return lines 30, 32 being significantly increased. The permanent supply 36 in this regard with the choke 38 also allows venting relative to the cooling unit 22 in any operating situation of the filter device. There can also be a venting capability which can be actuated by hand directly on the changeover means 24.

Figure 3:
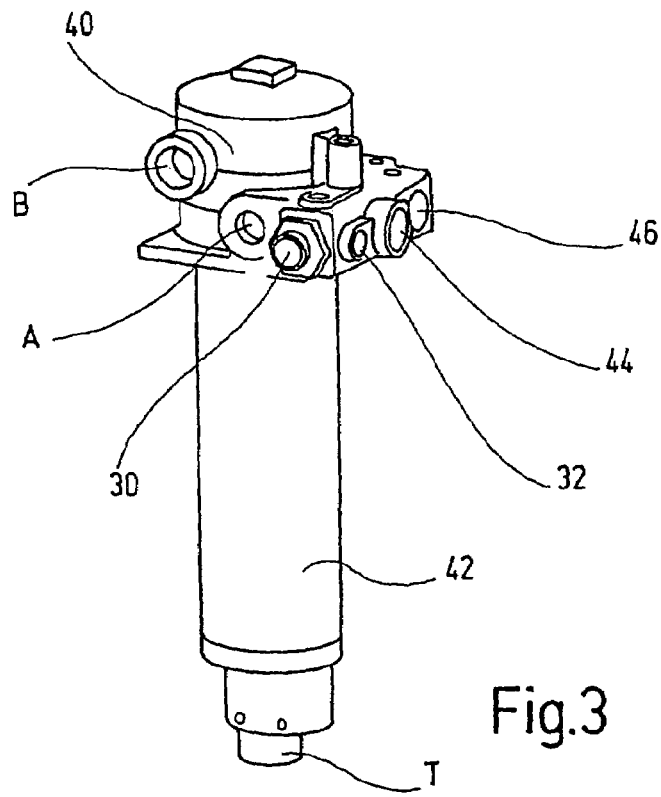
FIG. 3 is a perspective view of the filter device with its connections according to an embodiment of the present invention.

As shown in FIG. 3, in the preferred embodiment of the filter device of the present invention, all its components are combined into one unit. At least the changeover means 24 and the permanent supply 36 are components of a termination, cover or head part 40 made flange-like and joinable to the pot-like lower housing part 42 holding the filter unit 10. In the area of the upper cover part 40, connection possibilities for the working hydraulics A, the intake connection B and for the hydraulic motor or the hydraulic pump with respect to their return lines 30 and 32 can be provided. In addition to these connecting points, there are essentially in one plane the connecting points 44 and 46 for the connection of the secondary branch line 20 leading to the cooling unit 22 and originating from the cooling unit 22, respectively. There is furthermore the tank connection T on the bottom of the pot-like housing part 42.

Figure 4:
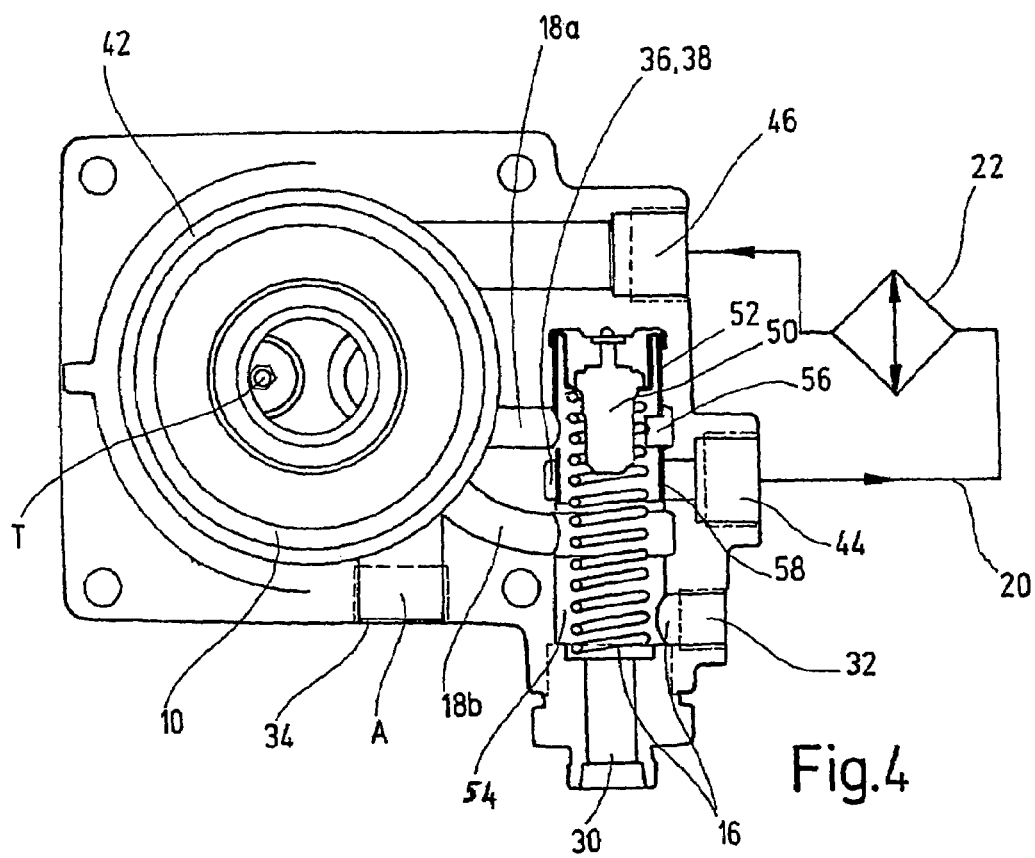
FIG. 4 is a top plan view in section through the filter housing of the filter device of FIG. 3, with the cooling unit connected.
Figure 5:
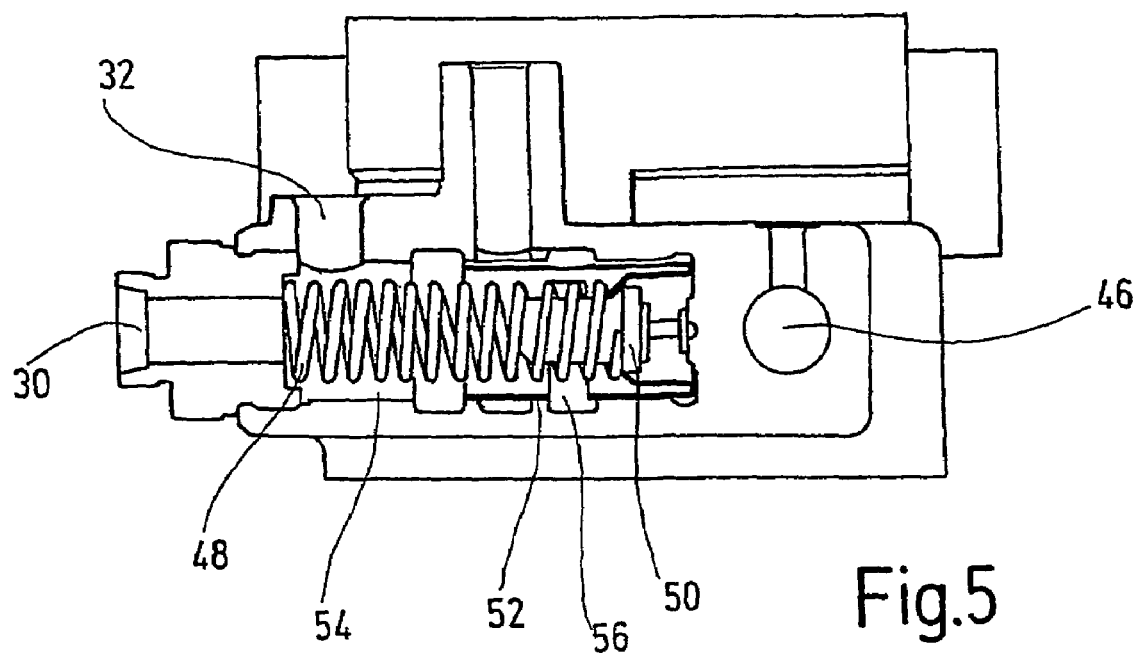
FIGS. 5 and 6 are side elevational views of filter housing of FIG. 4 in the positions of the oil temperature controller at low and high temperatures, respectively.
Figure 6:
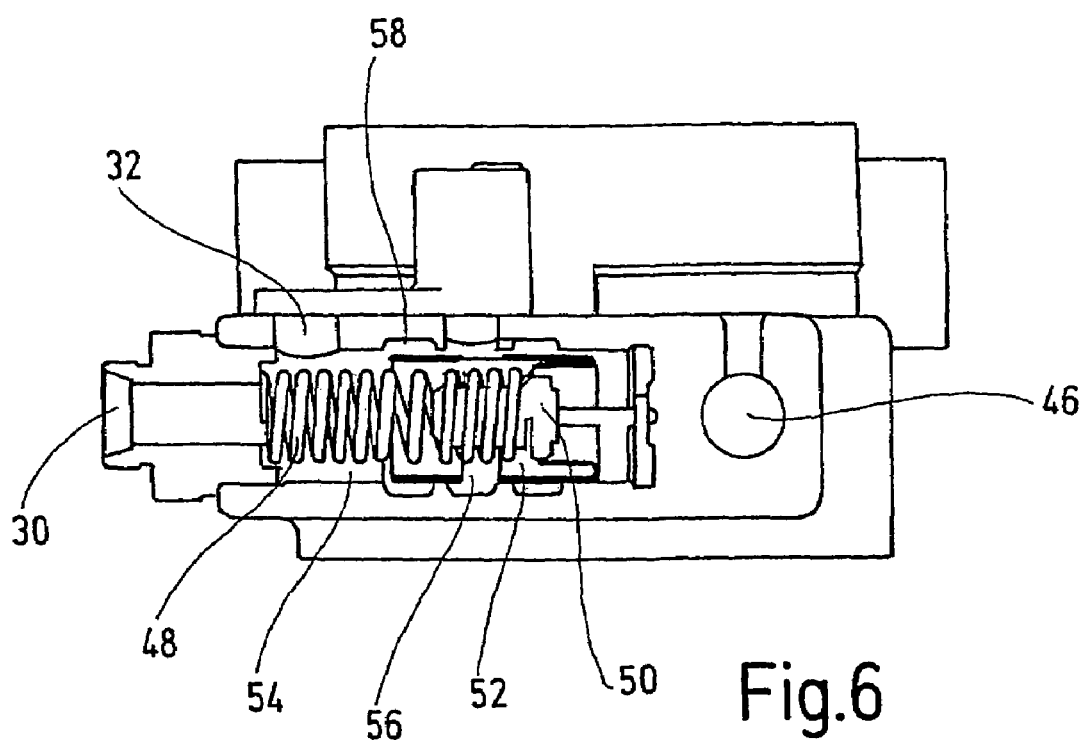

FIGS. 4–6 impart an improved structure and operation of the changeover means 24 in conjunction with the structure and the action of the permanent supply 36. The changeover means 24 in the form of the oil temperature controller has an expansion element 50 on which an energy storage device in the form of a compression spring 48 acts. Expansion elements 50 in this respect are relatively well known from motor vehicle engineering. The expansion element 50 triggers a sleeve-shaped pilot valve 52 guided in the valve space 54 to move lengthwise against the action of the compression spring 48. As FIG. 4 shows, the return lines 30 and 32 from the hydraulic motor and hydraulic pump discharge into the valve space 54. The supply line 16, leading to the filter unit 10 and passing at least partially as part of the valve space 54 into it, discharges into the valve space 54.

In order to increase the free cross-sectional area of the drain line 18, it is divided into two component branches 18 a,b, viewed in the direction of FIG. 4. The pilot valve actuating sleeve 52 in the controller position "low temperature" for the hydraulic medium covers the upper drain line branch 18a except for a fluid-carrying passage 56. Viewed in the lengthwise direction of the actuating sleeve 52, passage 56 passes through the sleeve wall part 58 in the middle and produces the fluid-carrying connection between branch 18a and the interior of the valve space 54. The secondary branch of the drain line 18b, which branch is the bottom one viewed in the direction of FIG. 4, is conversely kept entirely free from the wall part 58 of the pilot valve 52. The lower boundary of the wall part 58 ends above the lower drain line 18b. Between the two drain line branches 18 a,b, viewed in the direction of FIG. 4 from the right side, the connecting point 44 leads by the secondary branch line 20 to the cooling unit 22, and meshes with the valve space 54. In the controller position "low temperature", the pertinent connecting point is closed by the wall part 58 of the pilot valve 52, except for the choke 38 of the permanent supply 36 which establishes a permanent fluid-carrying connection between the connecting point 44 and the supply line 16. The choke 38 is formed by a fluid-carrying passage between the annulus as part of the valve housing, and discharges into the connecting point 44 on one side and the outside of the annular wall part 58 on the other side. The connecting point 46, to which part of the secondary branch line 20 is connected and which originates from the cooling unit 22, discharges directly into the fluid-carrying filter space of the filter unit 10. The lengthwise alignment of the valve space 54 extends crosswise to the lengthwise axis of the housing part 42 with the filter unit 10. The possible direction of flow through the cooling unit 22 via the secondary branch line 20 is shown in FIGS. 1, 2 and 4 with arrows.

The controller positions are detailed below using FIGS. 5 and 6. FIGS. 5 and 6 are views in planes extending 90° to the view of FIG. 4. In the controller position of "low temperature", the expansion element 50 is in its retracted position, with the compression spring 48 holding the sleeve-shaped pilot valve 52 in its end position, the right position viewed in the direction of FIG. 5. In this position, the top of the pilot valve 52 adjoins the right boundary wall of the valve space 54. FIG. 5 corresponds to the position of the controller in FIG. 4. The cold hydraulic medium supplied through the inflow lines 16, 30 and 32 to the valve space 54 is relayed via the valve space 54 or the passage 56 directly to the drain line 18 with its branches 18a, 18b so that the cold hydraulic medium can be supplied directly to the filter space with the filter unit 10, bypassing the cooling unit 22. The cooling unit 22 is supplied permanently by way of the choke 38 with hydraulic medium of low temperature. Accordingly, a damaging banking-up pressure in the return lines 30 and 32 cannot occur.

For the controller position of "high temperature", as shown in FIG. 6, the expansion element 50 is extended and the sleeve-shaped pilot valve 52 assumes it left-most position against the force of the compression spring 48 viewed in the direction at FIG. 6. In this position, the free bottom edge of the pilot valve 52 adjoins the left boundary wall of the valve space 54 as the stop part. The middle passage point 56 in the wall part 58 is then at the same height as the annular channel of the connecting point 44 which forms the choke 48. The hydraulic medium to be cooled travels solely via the connecting point 44 and the secondary branch line 20 to the cooling unit 22. After passing through the cooling unit 22, the cooled hydraulic medium travels via the connecting point 46 into the filter space with the filter unit 10. The remaining drain line 18, with its branches a and b, is then closed essentially fluid-tight by the wall part 58 of the pilot valve 52. Therefore in the controller position of "high temperature", hot hydraulic medium does not travel directly via the drain line 18 to the filter unit 10. With respect to the passage point 56 which is made large in cross section, in the controller "high temperature" position, essentially hot hydraulic medium no longer flows through the choke 38. The choke function is essentially canceled by clearing its choked cross section, and drainage proceeds on a priority basis by way of the passage 56 in the wall part 58 of the pilot valve 52.

Because an overflow channel 18b, parallel to the main channel 18a, is in the flow direction of the hydraulic medium in the supply line upstream of the changeover means, overflow channel 18b enlarges the flow cross section at low temperatures. A damaging banking-up pressure regardless of the actuation situation of the changeover means is thereby avoided. This overflow channel can be easily integrated structurally in the filter head, especially by combining the components of the filter and of the changeover means. Less installation space is required. The filter device of the present invention can accordingly be produced easily and economically using casting technology, as well as be easily and economically operated.

In the embodiment of a filter device of the present invention shown in FIG. 2, the two channels 18a and 18b shown in FIG. 4 are attached in the drain line 18 and lead to the filter unit 10. Such arrangement reduces the hydraulic resistance for the operating state "low temperatures".

While one embodiment has been chosen to illustrate the invention, it will be understood by those skilled in the art that various changes and modifications can be made therein without departing from the scope of the invention as defined in the appended claims.

The invention claimed is:

1. A filter device, comprising:
    a filter unit;
    at least one supply line and one drain line for connecting the filter unit to a hydraulic circuit;
    at least one cooling unit in the hydraulic circuit connected in a secondary branch line, said secondary branch line being connected in parallel to said supply line;
    a changeover means for conveying hydraulic medium at a definable temperature threshold to said cooling unit for cooling;
    a permanent supply for said cooling unit upstream of said changeover means in a flow direction of hydraulic medium in said supply line, said permanent supply being connected in parallel to said changeover means, discharging into said secondary branch line, and being another inflow line to said cooling unit;
    a choke in said permanent supply venting said cooling unit in low temperature operation of said changeover means without emergency manual actuation, said choke being separate from and spaced upstream from said cooling unit;
    an intake connection for connection to the hydraulic circuit and located downstream of said filter unit; and
    a back pressure valve located in said drain line downstream of said intake connection.

2. A filter device according to claim 1 wherein said back pressure valve is a check valve.

3. A filter device according to claim 1 wherein said changeover means comprises an oil temperature controller opening a clear conduit for flow of hydraulic medium to said filter unit in low temperature operation thereof and opening a conduit for flow of heated hydraulic medium to said cooling unit, said cooling unit then conveying cooled hydraulic medium to said filter unit through said secondary branch line without passing through a tank.

4. A filter device according to claim 1 wherein said supply line comprises hydraulic motor and transmission return line discharge connections upstream of said changeover means in a direction of hydraulic medium flow, and comprises a working hydraulics return line discharge connection downstream of said changeover means in the direction of hydraulic medium flow.

5. A filter device according to claims 1 wherein at least said changeover means and said permanent supply are components of a head part joined to a housing part holding said filter unit.

6. A filter device according to claim 5 wherein said changeover means comprises an oil temperature controller opening a clear conduit for flow of hydraulic medium to said filter unit in low temperature operation thereof and opening a conduit for flow of heated hydraulic medium to said cooling unit, said cooling unit then conveying cooled hydraulic medium to said filter unit through said secondary branch line.

7. A filter device according to claim 6 wherein said oil temperature controller comprises an expansion element with an energy storage device acting thereon, and a sleeve shaped pilot valve triggered by said expansion element and guided for lengthwise movement in a valve space against biasing of said energy storage device.

8. A filter device according to claim 7 wherein said supply line comprises hydraulic motor and transmission return line discharge connections upstream of said changeover means in a direction of hydraulic medium flow, and comprises a working hydraulics return line discharge connection downstream of said changeover means in the direction of hydraulic medium flow;
    said hydraulic motor and transmission return line discharge connections open into said valve space;
    said supply line leading to said filter unit opens into said valve space including a part of said secondary branch line leading to said cooling unit; and
    said sleeve-shaped pilot valve has a fluid-carrying passage in a wall part thereof.

9. A filter device according to claim 8 wherein said wall part comprises an outside periphery bordering on said choke and guided by respective wall parts of said head part.

10. A filter device according to claim 1 wherein said drain line comprises two channels to avoid a damaging banking-up pressure.

11. A filter device according to claim 1 wherein said secondary branch line extends between said permanent supply and said filter unit; and
    said permanent supply extends between said supply line and said cooling unit to bypass said changeover means.

12. A filter device according to claim 1 wherein said cooling unit is parallel to said supply line without passage through a tank.

* * * * *